(12) United States Patent
Brown et al.

(10) Patent No.: US 7,465,692 B1
(45) Date of Patent: Dec. 16, 2008

(54) REACTIVE MEDIA, METHODS OF USE AND ASSEMBLIES FOR PURIFYING

(75) Inventors: Kurt E. Brown, Cortland, NY (US); William L. Murphy, Homer, NY (US)

(73) Assignee: Pall Corporation, East Hills, NY (US)

( * ) Notice: Subject to any disclaimer, the term of this patent is extended or adjusted under 35 U.S.C. 154(b) by 0 days.

(21) Appl. No.: 09/717,374

(22) Filed: Nov. 22, 2000

Related U.S. Application Data

(63) Continuation of application No. 09/527,566, filed on Mar. 16, 2000, now abandoned.

(51) Int. Cl.
*C01B 31/08* (2006.01)
(52) U.S. Cl. ..................... 502/417; 502/184
(58) Field of Classification Search ............. 502/180, 502/416, 417, 184
See application file for complete search history.

(56) References Cited

U.S. PATENT DOCUMENTS

| | | | |
|---|---|---|---|
| 3,145,079 A | 8/1964 | Harbaugh | |
| 3,288,615 A | 11/1966 | Estes et al. | |
| 3,530,649 A | 9/1970 | Porsch et al. | |
| 3,572,014 A | 3/1971 | Hansen | |
| 3,804,942 A | 4/1974 | Kato et al. | |
| 3,852,406 A | 12/1974 | Krauss et al. | |
| 3,926,832 A | 12/1975 | Barosi | |
| 4,040,990 A | 8/1977 | Neely | |
| 4,063,912 A | 12/1977 | Neely et al. | |
| 4,064,043 A | 12/1977 | Kollman | |
| 4,133,660 A | 1/1979 | Steiner | |
| 4,177,142 A | 12/1979 | Halbfoster | |
| 4,242,226 A | 12/1980 | Siren | |
| 4,265,768 A | 5/1981 | Beasley et al. | |
| 4,329,844 A | 5/1982 | Shadman et al. | |
| 4,344,775 A | 8/1982 | Klein | |
| 4,346,557 A | 8/1982 | Shadman et al. | |
| 4,532,115 A | 7/1985 | Nishino et al. | |
| 4,560,672 A * | 12/1985 | Attig et al. ................ | 502/183 |
| 4,594,231 A | 6/1986 | Nishino et al. | |
| 4,603,148 A | 7/1986 | Tom | |
| 4,604,270 A | 8/1986 | Tom | |
| 4,659,552 A | 4/1987 | Tom | |
| 4,680,221 A | 7/1987 | Murayama et al. | |
| 4,685,940 A | 8/1987 | Soffer et al. | |
| 4,696,953 A | 9/1987 | Tom | |
| 4,713,224 A | 12/1987 | Tamhankar et al. | |
| 4,716,181 A | 12/1987 | Tom | |
| 4,734,339 A | 3/1988 | Schachner et al. | |
| 4,737,187 A * | 4/1988 | Hahn et al. ................ | 75/10.54 |
| 4,761,395 A | 8/1988 | Tom et al. | |
| 4,782,226 A | 11/1988 | Jeffries, Jr. et al. | |
| 4,789,386 A | 12/1988 | Vaughn et al. | |
| 4,831,011 A * | 5/1989 | Oikawa et al. ............. | 502/406 |
| 4,839,331 A | 6/1989 | Maroldo et al. | |
| 4,853,148 A | 8/1989 | Tom et al. | |
| 4,855,276 A | 8/1989 | Osborne et al. | |
| 4,867,960 A | 9/1989 | Tom | |
| 4,906,263 A | 3/1990 | von Blücher et al. | |
| 4,907,948 A | 3/1990 | Barosi et al. | |
| 4,916,105 A | 4/1990 | Rieck et al. | |
| 4,921,823 A | 5/1990 | Furneaux et al. | |
| 4,938,785 A | 7/1990 | MacPherson, Jr. et al. | |
| 4,946,592 A | 8/1990 | Galaj et al. | |
| 4,957,897 A | 9/1990 | Maroldo et al. | |
| 4,981,501 A | 1/1991 | Von Blücher et al. | |
| 5,037,791 A | 8/1991 | Comolli et al. | |
| 5,094,754 A | 3/1992 | Maroldo et al. | |
| 5,139,747 A | 8/1992 | Cato et al. | |
| 5,196,380 A | 3/1993 | Shadman | |
| 5,204,075 A | 4/1993 | Jain et al. | |
| 5,252,259 A | 10/1993 | Hardwick | |
| 5,262,198 A | 11/1993 | Wu et al. | |
| 5,298,229 A | 3/1994 | Hardwick | |
| 5,302,356 A | 4/1994 | Shadman et al. | |
| 5,344,630 A | 9/1994 | Brendley, Jr. et al. | |
| 5,403,798 A | 4/1995 | Brendley, Jr. et al. | |
| 5,456,740 A | 10/1995 | Snow et al. | |
| 5,460,792 A | 10/1995 | Rosenbaum | |

(Continued)

FOREIGN PATENT DOCUMENTS

| | | |
|---|---|---|
| CA | 508145 | 12/1954 |
| DE | 745 439 | 3/1944 |
| DE | 29 06 510 A1 | 8/1979 |
| DE | 3307087 | 9/1984 |
| DE | 3307087 A1 | 9/1984 |
| EP | 0 037 537 B1 | 10/1981 |
| EP | 0 037 537 | 6/1984 |
| EP | 0 332 789 B1 | 9/1989 |
| EP | 0 340 542 A1 | 11/1989 |
| EP | 0 428 052 A2 | 5/1991 |
| EP | 0 596 441 A2 | 5/1994 |
| EP | 0 641 592 A1 | 3/1995 |
| FR | 2 251 351 | 6/1975 |
| GB | 284808 | 2/1928 |
| GB | 944207 | 12/1963 |
| GB | 1246483 | 9/1971 |
| GB | 2 201 355 | 2/1988 |
| JP | 50-6440 | 3/1975 |
| JP | 52-8794 | 3/1977 |
| JP | 52-33170 | 3/1977 |
| JP | 53-114571 | 10/1978 |

(Continued)

OTHER PUBLICATIONS

P Ehrburger et al. 'Carbon as a Support for Catalysts' in Journal of Catalysis vol. 55 pp. 63-70 1978 no month.*

(Continued)

*Primary Examiner*—Stuart Hendrickson
(74) *Attorney, Agent, or Firm*—Leydig, Voit & Mayer, Ltd.

(57) ABSTRACT

A reactive medium comprising reactive particles having a surface area of about 300 $m^2$/gm to about 1500 $m^2$/gm and a size in the range of from about 0.10 mm to about 4 mm. The reactive particles include particles of an inorganic material, including carbon, and active metal sites, including sodium bonded to the carbon. The reactive medium can remove impurities to trace levels and has a high capacity for contaminants.

8 Claims, 3 Drawing Sheets

U.S. PATENT DOCUMENTS

| | | | |
|---|---|---|---|
| 5,474,963 | A | 12/1995 | Nakagawa et al. |
| 5,496,785 | A | 3/1996 | Abler |
| 5,536,302 | A | 7/1996 | Golden et al. |
| 5,635,148 | A | 6/1997 | Shadman |
| 5,637,544 | A | 6/1997 | Shadman |
| RE35,725 | E | 2/1998 | Briesacher et al. |
| 5,716,588 | A | 2/1998 | Vergani et al. |
| 5,829,139 | A | 11/1998 | Murphy et al. |
| 5,854,173 | A | 12/1998 | Chang et al. |
| 6,066,591 | A | 5/2000 | Murphy et al. |
| 6,248,690 | B1 * | 6/2001 | McKedy ............ 502/406 |
| 6,872,330 | B2 | 3/2005 | Mack et al. |

FOREIGN PATENT DOCUMENTS

| | | |
|---|---|---|
| JP | 55-20667 | 2/1980 |
| JP | 59-102419 | 6/1984 |
| JP | 59-160535 | 9/1984 |
| JP | 59-160535 | 11/1984 |
| JP | 63-51918 | 5/1988 |
| JP | 1-262902 | 10/1989 |
| JP | 3-12315 | 1/1991 |
| JP | 5-115735 | 5/1993 |
| JP | 5-137922 | 6/1993 |

OTHER PUBLICATIONS

Berger et al., Interactions of K and Na with Carbons in Chemistry and Physics of Carbon vol. 12 pp. 4-7, 1965.*

Leenaars, A.F.M., et al., *J of Material Science.*, 19, 1077-1088 (1984).

Leenaars, A.F.M., et al., *Chemtech.*, 560-564 (1986).

Berger, D. et al., Interaction of Potassium and Sodium With Carbon, pp. 1-37, in Walker, P. L., Jr., et al., *Chemistry and Physics of Carbon, A Series of Advanced*, vol. 12.

Métrot, A., et al., *J. Chim. Phys. Suppl.* 71-79 (1969).

* cited by examiner

REACTIVE MEDIA, METHODS OF USE AND ASSEMBLIES FOR PURIFYING

This is a continuation of application No. 09/527,566, filed on Mar. 16, 2000, now abandoned which is incorporated by reference.

FIELD OF THE INVENTION

This invention relates to reactive media, more particularly to reactive particles, used in the purification of fluids and to methods and assemblies for purifying fluids.

BACKGROUND OF THE INVENTION

Advances in manufacturing procedures in modern technology have depended in many instances on the purification of substances used as both reagents and as materials, in the presence of which various processes are conducted. The purification of many such substances, typically liquids and gases, has required the removal of impurities which are either heterogeneous (such as particles and macromolecules) or homogeneous (such as dissolved substances). In many instances both types of impurities may be present. Typically, heterogeneous impurities are removed by filtration techniques and devices in which the particles are physically retained by some sort or perforate or porous medium. Other methods and purification techniques are typically chosen to remove homogeneous impurities. Many of these techniques involve chemical modification of the homogeneous impurity and/or the affinity and attraction of the homogeneous impurity to a material which removes the homogeneous impurity from the fluid.

In many areas of modern technology, the concentration of impurities above several parts per million (ppm) cannot be tolerated. Indeed, in certain technologies, such as in the manufacture of semiconductor devices, the concentration of impurities in both the substances used as reagents as well as other materials, in the presence of which the processes are conducted, can still be detrimental even at levels at or below several parts per billion (ppb). For example, in many of the process gases employed in manufacturing semiconductor devices, even minute amounts of impurities, such as oxygen, moisture, carbon dioxide, and organic compounds such as methane, can be absorbed on the semiconductor wafer, causing degradation of performance, reduced manufacturing yield and adverse reliability.

A variety of devices and methods have been suggested for high level purification of fluids, including the use of a reactive membrane. Reactive membranes are disclosed, for example, in U.S. Pat. Nos. 5,196,380, 5,637,544, and 5,829,139. These patents, as well as any other patents, patent applications, and publications referenced in this application, are incorporated by reference. While a reactive membrane may be capable of purifying fluids such as gases used in the manufacture of semiconductors to a very high level, the capacity of the reactive membrane with respect to the space occupied by the membrane may be insufficient to keep the process online for the desired time before shutdown for regeneration or replacement of the reactive membrane. For example, a reactive membrane may be capable of reducing a contaminant such as oxygen in a gas stream to an acceptable level, e.g., a few parts per billion (ppb) or even to trace amounts, i.e., 1 ppb or less. However, the capacity of the reactive membrane is low, e.g., only about 1 or 2 liters of oxygen (at standard conditions) removed per liter of reactive membrane, and breakthrough of oxygen at unacceptable levels will occur relatively quickly, necessitating shutdown of the gas stream and replacement or regeneration of the reactive membrane. Increasing the capacity of the reactive membrane by adding one or more additional membrane layers will result in an undesirable increase in the pressure drop through the reactive membrane. Alternatively, increasing the capacity of the reactive membrane by increasing the nominal upstream surface area of a single layer reactive membrane, e.g., from 0.75 in$^2$ to 1.5 in$^2$, will require a larger membrane housing, which may be equally undesirable.

SUMMARY OF THE INVENTION

In accordance with one aspect of the invention, a reactive medium, which may be used for the removal of impurities from a fluid, comprises a plurality of reactive particles having a surface area of about 300 m$^2$/gm to about 1500 m$^2$/gm and a size in the range of from about 0.10 mm to about 4 mm. The reactive particles include particles of an inorganic material and active metal sites. The particles of inorganic material include carbon and the active metal sites include sodium chemically bonded to the carbon.

Reactive media embodying this aspect of the invention have the capacity to remove large amounts of impurities over long periods of time, thereby enhancing the productivity of many manufacturing processes. The inorganic particles may include porous particles formed, for example, from a carbon, a ceramic, a zeolite, a molecular sieve, or a metal oxide. Preferably, the active metal sites are disposed on and bonded to carbon. For example, the active metal sites may be chemically bonded to the exterior and/or interior surfaces of a porous carbon particle. Alternatively, the active metal sites may be chemically bonded to a carbon layer which, in turn, is supported by an inorganic particle such as a ceramic, zeolite, molecular sieve, or metal oxide particle, i.e., an inorganic particle which is not simply carbon. In preferred embodiments, the reactive medium comprises particles having a surface area greater than 300 m$^2$/gm, and/or a size in the range from about 0.10 mm or less to about 4 mm or more. In more preferred embodiments, the reactive medium comprises porous carbon particles and active sodium sites bonded to the porous carbon particles.

A method of making a reactive medium may comprise contacting porous carbon particles or inorganic particles with a carbon layer supported thereon and a metal species and chemically bonding the metal species to the porous particles. The metal species are activated thereby forming the reactive medium which interacts with and removes impurities from a fluid.

A method of making a reactive medium may comprise contacting porous particles of an inorganic material a metal species and chemically bonding the metal species to the porous particles. The metal species are activated thereby forming the reactive medium which interacts with and removes impurities from the fluid.

Methods embodying these aspects of the invention provide a highly effective reactive medium. In preferred embodiments, the porous carbon particles or the inorganic particles with a carbon layer are contacted with an oxidizing agent prior to being contacted with the metal species. The oxidizing agent may be oxygen contained in a carrier gas, e.g., an inert gas such as argon. The metal species may be contacted with the carbon containing particles using any carrier liquid such as a dehydrated or organic solvent in which the metal or metal oxide can be dissolved. Examples include methanol, ethanol, isopropanol, ethers, and ammonia. In a preferred embodiment, argon containing oxygen is passed through generally spherical, porous carbon particles held at an elevated temperature, e.g., about 400° C.; the carbon particles are then cooled, e.g., to about room temperature, soaked in a solution of sodium methoxide in methanol, depositing sodium as the metal species on the surfaces of the carbon particles. The deposited sodium species is then activated by heating the carbon particles and sodium species, e.g., to about 500° C., in an inert gas or a mixture of an inert gas and a reducing gas such as ultra high pure (UHP) hydrogen.

An embodiment of a purification assembly for the removal of impurities from a fluid comprises a housing and a bed of reactive particles. The housing has a fluid inlet and a fluid outlet, and the bed of reactive particles is disposed within the housing and extends across a fluid flow path between the fluid inlet and the fluid outlet. The reactive particles comprise particles of an inorganic material which support active sites including a Group II metal such as magnesium, calcium or barium, a Group I alkali metal such as sodium, potassium, lithium, rubidium, or cesium, a transition metal such as manganese, copper, iron, nickel tin, titanium, zirconium, or aluminum, or mixtures thereof.

An embodiment of a method for the removal of impurities from a fluid comprises passing the fluid through a bed of reactive particles. The reactive particles include particles of a porous inorganic material which support active sites including a Group II metal, a Group I alkali metal, or a transition metal, or mixtures thereof. The method further comprises interacting at least a portion of any impurities in the fluid with the active sites on the reactive particles, thereby removing the portion of impurities from the fluid.

Assemblies and methods embodying these aspects virtually eliminate a wide variety of impurities from many different fluids, including gases and liquids. For example, impurities such as oxygen, water vapor, carbon dioxide and/or carbon monoxide may be reduced to trace levels, i.e., 1 ppb or less. Further, the bed of reactive particles of the invention has a large capacity for the removal of impurities with relatively low metal loading on the carbon. Additionally, a low resistance to fluid flow, provides a low pressure drop for fluid flowing through the bed. The bed of reactive particles may be a loose bed or a compressed bed of reactive particles or the reactive particles may be immobilized by a binder or in a fibrous matrix. Further, the bed of reactive particles may be the sole purification element or it may supplement other purification elements such as a filter element or a reactive membrane.

DESCRIPTION OF THE PREFERRED EMBODIMENTS

Figure 1:
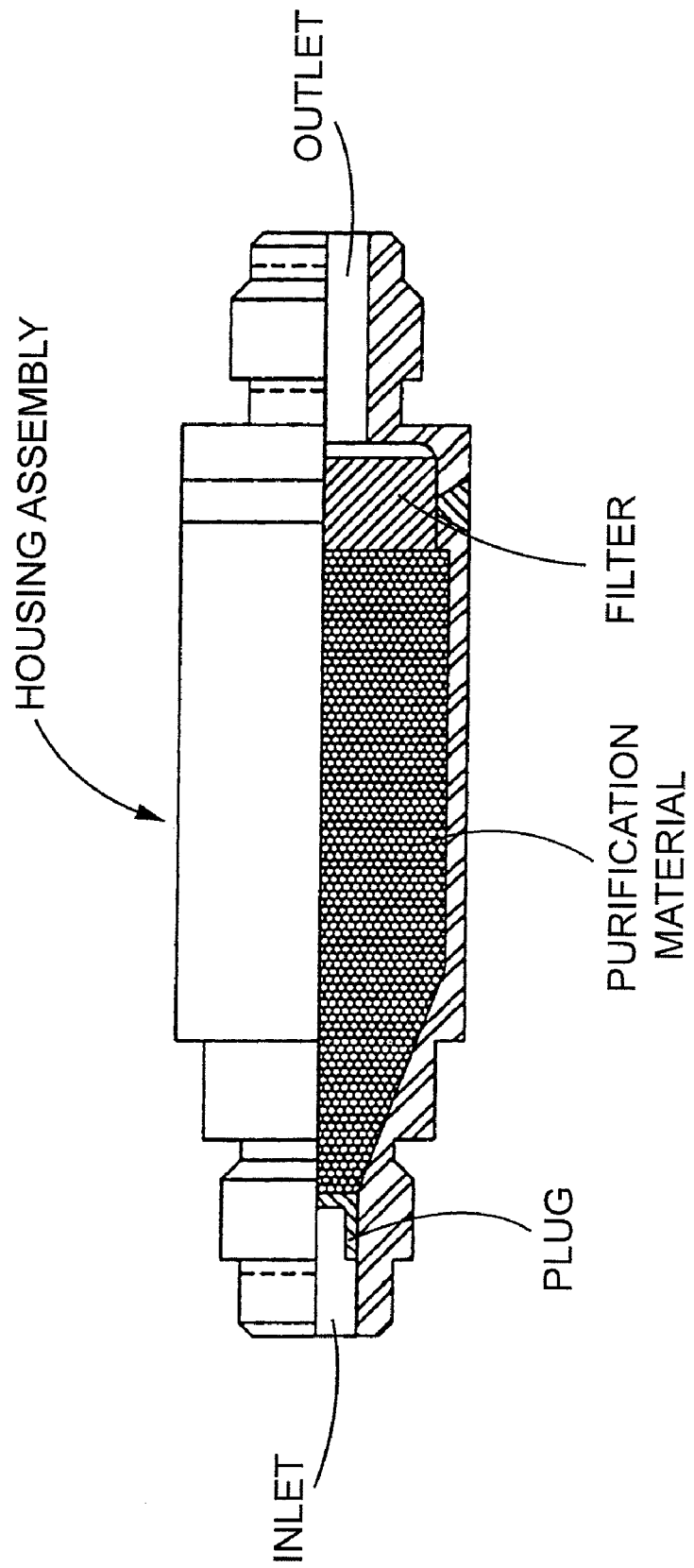
FIG. 1 is a partial cross sectional view of a housing assembly used to form a fixed bed.

The present invention is directed to reactive media and method and assemblies utilizing the reactive media for the purification of fluids, particularly gases. Reactive media embodying the present invention comprise reactive particles which include particles of an inorganic material, preferably a porous inorganic material. The particles of inorganic material support active sites which include a metal, preferably at least partially deoxygenated metal species, most preferably substantially completely deoxygenated metal species of Group I alkali metals, Group II alkaline earth metals, transition metals, and mixtures of these metal species.

The particles of inorganic material may comprise porous particles, such as gas permeable particles, including carbon particles such as activated carbon particles, ceramic particles, particles of a metal oxide such as alumina, titania, or zirconia, and particles of a molecular sieve such as a zeolite. The non-carbon porous particles may preferably be metal impregnated. The porous inorganic particles may have a surface area of up to about 300 $m^2/gm$ or more and, preferably greater than about 700 $m^2/gm$. For example, the surface area of the porous particles may be in the range from about 300 $m^2/gm$ to about 1500 $m^2/gm$, preferably from about 900 $m^2/gm$ to about 1200 $m^2/gm$.

The particles of the inorganic material may take a variety of regular or irregular shapes, e.g., rods, fibers, granules, or preferably spheres, and a wide range of nominal particle sizes is suitable. For example, the nominal particle size may be in the range of −5×140 U.S. Standard sieve series, i.e., the size of the particles is such that they pass through a U.S. Standard size 5 screen but do not pass through a U.S. Standard size 140 screen. Preferably the nominal particle size is in the range of −12×+40 U.S. Standard sieve series. Alternatively, the nominal particle size may be in the range from about 0.1 mm to about 4 mm.

The reactive particles are preferably packed in a housing of a purification assembly. Accordingly, the nominal size of the particles may be selected in accordance with the size of the bed space in the housing. For example, the ratio of the smallest diameter of the bed space to the nominal size of the particles may be about 10:1 or more and, preferably, greater than about 20:1.

The exposed surfaces, internal and/or external, of the inorganic particles may be treated in a variety of ways to promote the proliferation and/or enhance the effectiveness of the active sites. Non-carbon particles may be treated by positioning a carbon layer between the inorganic particle and the active sites. For example, at least one carbon layer may be directly deposited on the exposed surfaces of the particles. The carbon layer is preferably deposited on substantially all interior and exterior surfaces of the non-carbon particles and may be formed in any suitable manner. For example, the carbon layer may be formed using a chemical vapor deposition (CVD) technique via the dissociation or disproportionation of a carbon-containing material such as a carbon-containing gas. In one example of a CVD technique, a mixture of CO, hydrogen, and an inert gas may be passed through a bed of the non-carbon particles. Disproportionation of the gas mixture and deposition of the carbon on the interior and exterior surfaces of the non-carbon particles may be carried out at a temperature in the range from about 250° to about 450° C. and at a flow rate and time which provides a uniform carbon layer on substantially all surfaces of the non-carbon particles. The uniformity of the carbon layer may be enhanced by the metallic impurities in the metal impregnated non-carbon, inorganic particles.

Both carbon particles and inorganic particles with a carbon layer supported thereon may be treated with an oxidizing agent to enhance the affinity for and ability to adsorb carbon specie(s) from solution upon the subsequent introduction of the carbon to the solution. Oxidation of the carbon may be performed using packed bed, fluidized bed, or other techniques common to the art. An effective Reynolds number ($Re_{eff}$) may be used to define the flow conditions with respect to the particle; where $Re_{eff}$ is equal to the particle diameter times the superficial mass velocity divided by the viscosity of the gas.

$$Re_{eff} = (D_{part} \times G)/\mu$$

In general, selection may be made so as to obtain sufficient heat transfer, mass transfer, and residence time for reaction while minimizing or preventing any attribution from the particles being processed. As an example, carbon or carbon containing particles may be loaded into a housing so as to create a packed bed. An inert gas such as argon may then be introduced with sufficient flow, e.g., with an $Re_{eff}=0.7$, so as to purge both air and moisture from the particles and housing. With purge flow continuing, the temperature may then be raised to an elevated level in the range from about 400° C. to about 600° C., preferably about 500° C., via a gradual ramp to drive off any additional moisture that may remain in the particles. While soaking at this elevated temperature, a reducing atmosphere of ultra high purity hydrogen or a mixture of hydrogen and argon may be introduced for a period of time in the range from about 30 to about 300 minutes. The hydrogen or hydrogen/argon mixture may be passed through the bed of carbon or carbon containing particles at a flow rate sufficiently high so as to supply a reducing atmosphere to all of the particles yet sufficiently low so as to create an isothermal profile both across the diameter of the bed and along the length of the bed, e.g., with an $Re_{eff}=0.02$. The heated bed may then be cooled in a stream of inert gas such as argon with sufficient flow, e.g., with an $Re_{eff}=0.3$, so as to displace any free hydrogen on or within the particles to a temperature in the range from about 200° to about 500° C., e.g., about 400° C. A mixture of an oxidizing agent and an inert gas such as argon may then be directed through the bed of carbon particles or carbon containing particles at a reduced temperature, e.g., 400° C. A variety of oxidizing agents may be useful, but a gaseous oxidizing agent, such as oxygen, is preferred. The argon/oxygen mixture may be introduced for a time period and flow rate sufficient to create a controlled and uniform distribution of oxidation sites on the surface of the carbon throughout the bed of particles. For example, a mixture of argon and about 1 vol. % to about 25 vol. % preferably about 10 vol. %, oxygen may be passed through the bed of carbon particles for a period of time in the range from about 10 minutes to about 2 hours, preferably about 80 minutes, with adequate flow, e.g., with an $Re_{eff}=0.7$ to provide a desired distribution of oxidation sites. The bed of carbon particles or carbon containing particles may then be cooled to room temperature in an inert atmosphere such as argon so as to prevent further uncontrolled oxidation of the carbon. While a gaseous treatment is the preferred oxidizing treatment for carbon particles, they may alternatively be treated with an oxidizing agent in a liquid.

Upon subsequent introduction of the metal specie(s), the active sites preferably comprise at least partially deoxygenated, and, most preferably, substantially completely deoxygenated metal species. As used herein, the terms "at least partially deoxygenated metal species" and "substantially completely deoxygenated metal species" refer to metals which have been reduced so as to be chemically bound to less than the stoichiometric amount of oxygen. Preferably, the metal species includes a Group I alkali metal such as sodium, potassium, lithium, rubidium or cesium or a Group II metal such as magnesium, calcium or barium, a transition metal such as manganese, copper, iron, nickel tin, titanium, zirconium, or aluminum, or a mixture of these metal species. Substantially completely deoxygenated metal species are highly preferred because of the enhanced capacity of the resulting particles and the enhanced removal capability.

The active species may be supported by the inorganic particles in a variety of ways. For example, the metal species may be chemically bonded to the carbon layer which is deposited on the non-carbon layer of the non-carbon particles or to the surfaces of the carbon particles. The active species may be deposited and bonded to the carbon, e.g., the surfaces of the carbon particles, in any suitable manner. For example, the metal species may be deposited on the particles using a CVD technique where a vapor of the metal species is directed through a bed of the particles at a temperature and at flow rate which allows the metal species to be deposited on most or, preferably, substantially all surfaces of the particles.

Preferably, the metal species is deposited on the particles using a mixture, e.g., a solution or a slurry, of a carrier liquid and the metal species. For example, a solution of an alkali metal species, e.g., sodium methoxide, and a non-aqueous carrier liquid, e.g., methanol, may be contacted with the bed of particles. In a preferred embodiment, a bed of carbon particles may be soaked, e.g., at room temperature, in a bath of methanol containing sodium (in the form of the methoxide) in the range from about 0.2 wt. % to saturation, e.g., 3.0 wt. %, for a period of time sufficient to fully expose all surfaces of the carbon particles to the solution, e.g., from about 1 hour to about 40 hours, preferably 2 hours to 10 hours. After soaking the bed of particles in the metal species/carrier liquid mixture, the mixture may be removed from the bed of particles and the bed may be purged of any remaining mixture, e.g., by heating the bed to about 100° C. to about 200° C. and/or purging the bed with an inert gas or by drawing a vacuum on the bed. The molar level of metal present in the carbon particles or the carbon portion of the carbon containing particles is preferably in the range of from about 0.2 to about 5.5, more preferably about 1.0 to about 3.2, and most preferably about 1.6 to about 2.7. For example, for sodium metal this is equivalent to 0.5 to 10 weight % of the metal based on the total weight of the metal-containing particles, preferably 2.0 to 6.0 weight percent, and most preferably 3.0 to 5.0 weight percent.

The inorganic particles and the metal species may then be heated to an elevated temperature, e.g., greater than about 300° C., preferably greater than about 400° C. and more preferably between about 475 and about 525° C. to further bond the metal species to the carbon and to activate the metal species. The metal species is thus chemically bonded to the carbon, where "chemically bonded" includes ionic and covalent bonds and bonds due to forces such as van der Waals forces. Further, the metal species is activated, e.g., the metal species is partially or preferably substantially completely deoxygenated and, thereby, presented in a highly reactive reduced form. The bed of inorganic particles supporting the metal species may be heated in a vacuum, in an inert gas, or preferably in the presence of a flowing stream of a reducing agent such as ultra high purity hydrogen gas. The bed may be heated for a period of time, e.g., from about 4 hours to about 24 hours at a temperature in the range of from about 400° C. to about 600° C., preferably about 490° C., to substantially completely bond and activate the metal species and may then be cooled in an inert atmosphere such as argon, e.g., to room temperature, yielding the reactive medium of the present invention. A preferred method of activation is to pass a stream of an inert gas such as argon at ambient temperature through a bed of the inorganic particles supporting the metal species, followed by a stream of heated inert gas such as argon at a temperature of 490° C., followed by a stream of ultra pure hydrogen also at a temperature of 490° C.

In preferred embodiments the reactive medium is in the form of a plurality of loose reactive particles which can be used to at least partially fill, preferably completely fill, open spaces or volumes in the housings of filtration/purification assemblies. The loose reactive particles can be readily introduced into open spaces in existing filtration/purification housings of a wide variety of sizes and shapes without modification, as would be required with rigid, inflexible or fragile reactive membranes. The reactive particles are capable of utilizing substantially all of the open space in a wide variety of filtration/purification assemblies, regardless of the particular shape of the space, while presenting a relatively low resistance to fluid flow and minimizing the pressure drop through the assembly.

By using reactive media embodying the present invention in such a manner, the capacity of existing filtration/purification assemblies can be substantially increased, resulting in longer on stream times and improved economies of operation. Further, reactive particles embodying the present invention are capable of reducing heterogeneous contaminants and reducing homogeneous contaminants to trace amounts and, when used in combination with a reactive membrane, to concentrations in the ppb to parts per trillion (ppt) range.

Filtration/purification assemblies embodying the present invention comprise a housing having a fluid inlet and a fluid outlet. Disposed within the housing in a flow path between the fluid inlet and fluid outlet is a bed of the reactive particles. Preferably, the reactive particles are tightly or compressively loaded within the bed in the housing. Alternatively, the reactive particles may be immobilized within the bed, for example, by a binder or within a fiber matrix, e.g., a carbon fiber matrix.

In some preferred embodiments, the housing may contain the reactive particles as the sole reactive medium. In other preferred embodiments, the housing may contain a bed of the reactive particles and one or more additional filtration or purification elements, including a filter medium or a reactive membrane, such as the type described in U.S. Pat. Nos. 5,196,380, 5,637,544, or 5,829,139. The bed of reactive particles is preferably upstream of the reactive membrane but may be downstream or upstream and downstream of the reactive membrane. Further, at one of, or preferably both of, the fluid inlet and the fluid outlet there may be disposed barrier members as described in U.S. Pat. No. 5,829,139. As used herein "barrier member" is a member which prevents particulate and fluid contaminants from entering the inlet or outlet, and thereby the housing. In some instances the member may be used to prevent entry of all fluids to the housing, except under controlled conditions. The barrier member may be a porous medium or membrane or may be a device, such as a valve. It is preferred that at the fluid outlet the barrier member take the form of a medium, preferably a type of a reactive medium, similar to the fluid permeable, reactive filter medium disposed intermediate the fluid inlet and fluid outlet and employed as the main means of removing the bulk of contaminants entering the housing. At the inlet, it is preferred that the barrier member be either a valve, such as a poppet valve, or a porous medium, such as a reactive medium, also similar to the fluid permeable, reactive membrane in the interior of the housing.

Filtration/purification assemblies embodying the present invention are highly effective in removing a wide variety of contaminants, both heterogeneous and homogeneous, from fluids, particularly from gases. Accordingly, the filtration/purification assemblies may find application in a variety of processes including, for example, removal of undesirable substances or impurities and particulate contaminants in gas or liquid source streams used in electronics manufacture. Depending upon the selection of the metal species which forms part of the reactive medium, trace impurities such as oxygen, water, carbon monoxide, carbon dioxide, methane and other hydrocarbons may be removed from a gas stream (e.g., a stream of an inert gas such as nitrogen or a noble gas such as argon). In addition to the purification of inert and noble gas streams, the reactive medium may be employed to remove other undesirable substances, such as moisture, from streams of reactive gases, such as oxygen, silanes, ammonia, and other hydride gases.

Reactive media and filtration/purification assemblies embodying the invention can reduce the concentration of homogeneous contaminants to very low levels, e.g., to a few parts per billion or even to trace amounts, i.e., 1 ppb or less. When used in combination with a reactive membrane, the concentration of homogeneous contaminants may be reduced to even lower levels. For example, in an inert gas stream, the concentration of oxygen, carbon dioxide, or carbon monoxide may be reduced to about 2 parts per trillion (ppt) and water to no more than about 12 ppt or less (12 ppt is the lower end of sensitivity for presently available water content sensors). These low levels of contaminants are obtained while still maintaining high capacities for removal of the contaminants, affording longer on-stream processing and reduced downtimes, and low pressure drops, allowing higher through flows. By way of example, reactive media in accordance with this invention have capacities for the removal of oxygen of 5 liters of oxygen at standard conditions per liter of reactive medium, preferably at least 8 liters, and more preferably 12 or more liters of oxygen removal capacity per liter of reactive medium.

EXAMPLE 1

Ten (10) gms of dried RHC-572, a carbonaceous adsorbent, spherical in form with a nominal surface area of 1100 $m^2/g$, a bulk density of 0.48 g/ml, and a nominal particle size defined by a −20×+50 U.S. Standard sieve fraction, and available from Rohm & Haas, Co., was soaked in a solution of sodium dissolved in methanol for approximately 16 hours. The initial concentration of sodium in the solution was determined to be 2100 ppm by weight via gravimetric measurements. After the soak, the methanol solution was decanted off and the remaining solids were placed under vacuum for two (2) hours. Analysis was performed on the final solution to determine the remaining concentration of sodium and thereby the percentage of sodium adsorbed by the solids which appeared to be greater than 10 weight percent based on the weight of the carbon particles and the adsorbed sodium. A portion of the vacuum dried solids were then transferred into a housing assembly with a known volume so as to created a fixed bed, as shown in FIG. 1. The weight of the solids in the assembly was measured and the bulk density was calculated.

Figure 2:
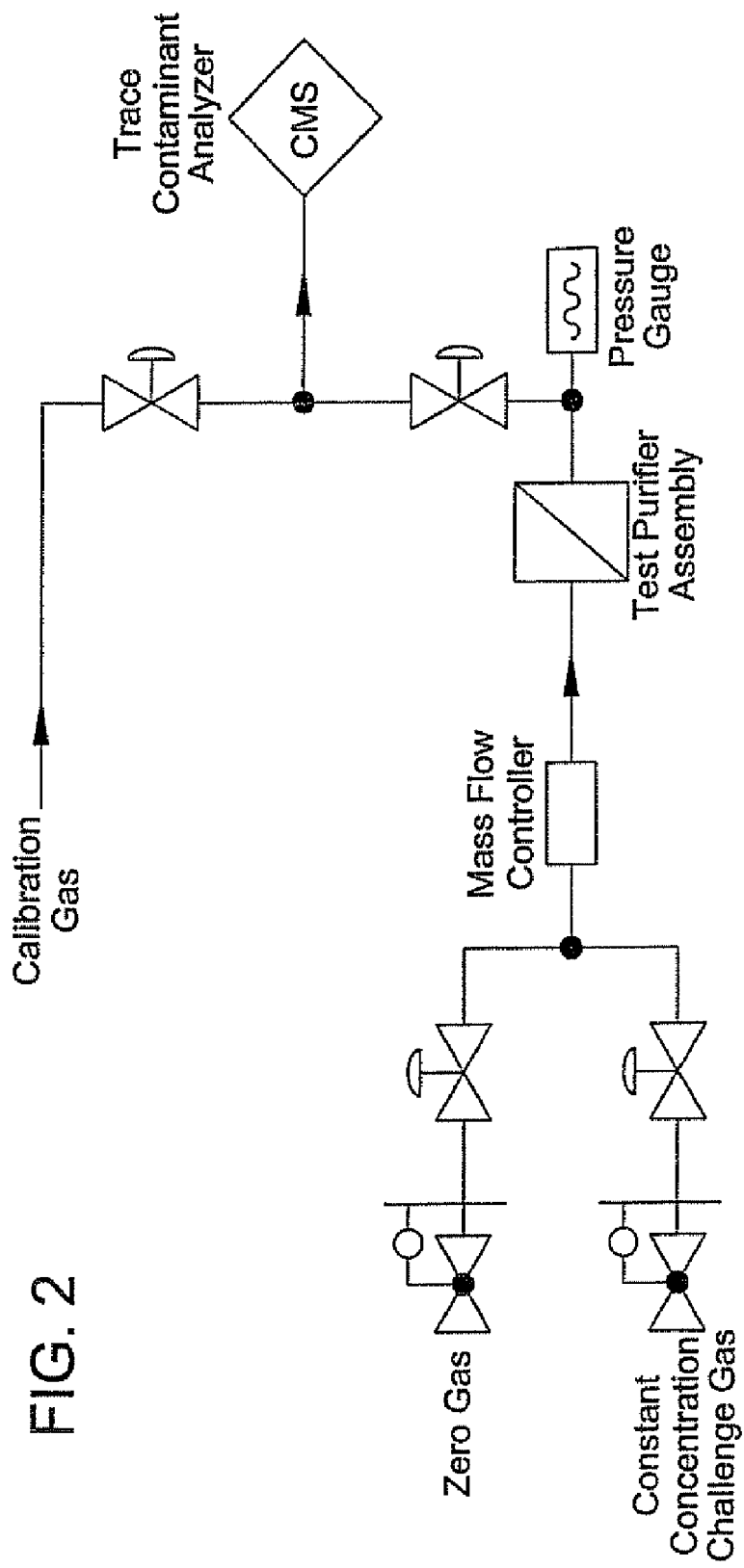
FIG. 2 is a schematic of a challenge test stand used in carrying out tests on the reactive media of this invention.

The test assembly was then transferred to a process stand, and ultra high purity (UHP) hydrogen at a temperature of 480° C. was introduced into the assembly. The assembly was held at 480° C. while hydrogen was passed through the assembly for a period of 9 hours so as to bond and activate the sodium. Upon completion of this activation process UHP argon was introduced into the test assembly for cooling and removal operations. The activated sample was then transferred under an inert atmosphere of argon to a challenge test stand, as shown in FIG. 2. Here the sample was: 1) installed with purified insert gas flow, 2) then the gas stream was switched to a challenge line that introduced both oxygen and moisture contaminants at known concentrations in an argon gas carrier stream, 3) effluent concentrations were monitored throughout the installation, testing and breakthrough stages, and 4) using totallized flow and the challenge concentrations the capacity of the material was determined to be 1.59 liters (L) oxygen per liter (L) of solids material. Results showed that the solids material had the ability to provide a gas stream with only trace levels of contaminants even under challenge conditions.

Again, the test assembly was transferred to the activation process stand where UHP hydrogen at a temperature of 480° C. was introduced into the assembly. The assembly was held at 480° C. while hydrogen was passed through the assembly for a period of 18 hours so as to activate the sodium. Upon completion of this reactivation process, UHP argon was introduced into the test assembly for cooling and removal operations. The reactivated sample was then transferred to a challenge test stand where it was tested for capacity via the same procedure. The new capacity of the material was determined to be 5.43 L oxygen per L of solids material.

Again, the test assembly was transferred to the activation process stand where UHP hydrogen at a temperature of 480° C. was introduced into the assembly. The assembly was held at 480° C. while hydrogen was passed through the assembly for a period of 36 hours so as to activate the sodium. Upon completion of this reactivation process, UHP argon was introduced into the test assembly for cooling and removal operations. The reactivated sample was then transferred to a challenge test stand where it was tested for capacity via the same procedure. The new capacity of the material was determined to be 4.47 liters oxygen per liter of solids material.

EXAMPLE 2

Ten (10) gms of a dried granular carbon, PCB activated carbon, with a nominal surface area of 1200 $m^2/g$, a bulk density of 0.38 to 0.44 g/ml, and a nominal particle size defined by a −12×+30 U.S. Standard sieve fraction, and available from Calgon Corporation, was soaked in a solution of methanol and dissolved sodium methoxide for approximately 40 hours. The methanol solution was then decanted off and the remaining solids were placed under vacuum for two (2) hours. The initial concentration of sodium in the solution was determined to be 1.234 wt. % via gravimetric measurements. The weight percent of sodium adsorbed by the solids was found to be 3.3%. A portion of the solids was then transferred into a housing assembly with a known volume so as to create a fixed bed, as shown in FIG. 1. The weight of the solids was measured and the bulk density was calculated to be 0.44 gm/cc.

The test assembly was then transferred to a process stand, and UHP hydrogen at a temperature of 480° C. was introduced into the assembly. The assembly was held at 480° C. while hydrogen was passed through the assembly for a period of 18 hours so as to activate the sodium. Upon completion of this activation process purified UHP argon was introduced into the test assembly for cooling and removal operations. The activated sample was then transferred under an inert atmosphere of argon to a challenge test stand, as shown in FIG. 2. Here the sample was: 1) installed with purified insert gas flow, 2) then the gas stream was switched to a challenge line that introduced both oxygen and moisture contaminants at known concentrations, 3) effluent concentrations were monitored throughout the installation, testing and breakthrough stages, and 4) using totallized flow and the challenge concentrations, the capacity of the material was determined to be 7.40 L oxygen per L of solids material. Results showed that the material had the ability to provide a gas stream with trace levels of contaminants even under challenge conditions.

EXAMPLE 3

Ten (10) gms of particulate alumina, having a bulk density of 0.70 gms/ml, a surface area of 200 $m^2/gm$ and a nominal particle size defined by a −8×+30 U.S. Standard sieve fraction, are coated with a carbon layer by CVD via disproportionation of CO in a hydrogen/inert gas mixture. The carbon layer has a thickness of about 500 Å. The resulting carbon-coated alumina particles have a surface area of approximately 750 $m^2/gm$.

The carbon-coated alumina particles are then soaked in a solution of 3 wt. % sodium (in the form of sodium methoxide) in methanol for 20 hours at temperatures between 20 and 50° C. The solution is then decanted off and the remaining solids are placed under vacuum for two (2) hours. Analysis is performed on the final decanted solution to determine the remaining concentration of sodium and thereby the percentage of sodium adsorbed by the solids. The initial concentration of sodium adsorbed on the carbon-coated alumina particles is determined to be approximately 2 wt. % via gravimetric and analytic measurements of the solids. A portion of the solids is then transferred into a housing assembly with a known volume to create a fixed bed, as shown in FIG. 1. The weight of the solids is measured and the bulk density is calculated.

The test assembly is then transferred to a process stand, and UHP hydrogen at a temperature of 480° C. is introduced into the assembly. The assembly is held at 480° C. while hydrogen was passed through the assembly for a period of 18 hours to bond and activate the sodium. Upon completion of this activation process UHP argon is introduced into the test assembly for cooling and removal operations. The activated sample is then transferred under an inert atmosphere of argon to a challenge test stand, as shown in FIG. 2. Here the sample is: 1) installed with a purified inert argon gas flow, 2) then the gas stream is switched to a challenge line that introduces both oxygen and moisture contaminants at known concentrations in an argon gas carrier stream, 3) effluent concentrations are monitored throughout the installation, the testing and breakthrough stages, and 4) using totalized flow and the challenge concentrations, the capacity of the solids material is determined. Results will show that the material has the ability to generate gas streams with contaminants reduced to trace levels even under challenge conditions.

EXAMPLE 4

Ten (10) grams of a dried carbon, Kureha bead shaped activated carbon (BAC), with a nominal surface area of 1150 $m^2/gm$, a bulk density of 0.58 $gm/cm^3$, and a nominal particle size of 0.50±0.05 mm in diameter, and available from Kureha Chemical Industry Co., LTD was soaked in a solution of methanol and dissolved sodium methoxide for approximately two (2) hours. The amount of sodium in the solution was determined gravimetrically to be 3.0% by wt.

The methanol solution was then decanted off and the remaining solids were placed under vacuum for two (2) hours. A portion of these solids was tested to determine the amount of sodium in the solids; analysis showed that the sample contained 4.2% sodium by wt. Another portion of the solids was then transferred into a housing assembly with a known volume so as to create a fixed bed, as shown in FIG. 1. The weight of the solids was measured and the bulk density of the material was calculated to be 0.604 $gm/cm^3$.

Figure 3:
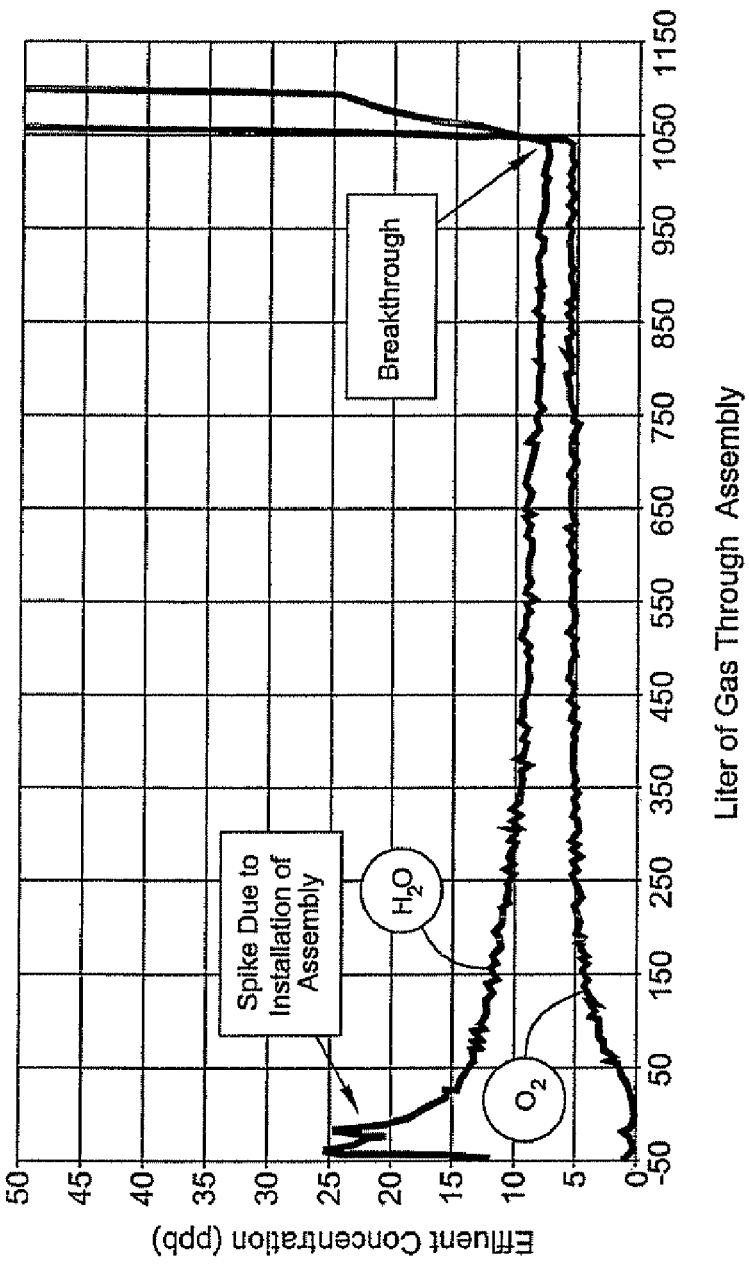
FIG. 3 is a graph of gaseous contaminant concentrations in the effluent stream.

The test assembly was then transferred to a process stand, and UHP hydrogen at a temperature of 480° C. was introduced into the assembly. The assembly was held at 480° C. while hydrogen was passed through the assembly for a period of eighteen (18) hours so as to activate the sodium. Upon completion of this activation process purified UHP argon was introduced into the test assembly for cooling and removal operations. The activated sample was then transferred under an inert atmosphere of argon to a challenge test stand, as shown in FIG. 2. Here the sample was: 1) installed with purified inert gas flow, 2) then the gas stream was switched to a challenge line that introduced both oxygen and moisture contaminants at known concentrations in an argon carrier gas, 3) effluent concentrations were monitored throughout the installation, testing, and breakthrough stages, and 4) using totalized flow and the challenge concentrations, the capacity of the material was determined to be 12.30 liters oxygen per liter of solids material. Results showed that this material had the ability to purify the gas stream by removing contaminants to very low levels even under challenge conditions, as shown in FIG. 3.

The invention claimed is:

1. A reactive medium for the removal of impurities from a fluid comprising a plurality of reactive particles having a surface area of greater than about 900 $m^2/gm$ and a size in the range of from about 0.10 mm to about 4 mm and including particles of an inorganic material and active metal sites, the particles or inorganic material including activated carbon and the active metal sites including sodium chemically bonded to the carbon, wherein the sodium is substantially deoxygenated to react with and remove impurities from a fluid and wherein the inorganic material includes spherical carbon.

2. A reactive medium for the removal of impurities from a fluid comprising a plurality of reactive particles having a surface area of about 900 $m^2/gm$ to about 1500 $m^2/gm$ and a particle size of about −12×+40 U.S. Standard sieve and including particles of an inorganic material and active metal sites, the particles of inorganic material including particles of spherical, activated carbon and the active metal sites including sodium chemically bonded to the carbon, wherein the sodium is substantially deoxygenated to react with and remove impurities from a fluid and the sodium is present in the reactive medium in an amount of from about 0.2 to about 10 weight percent.

3. A reactive medium for the removal of impurities from a fluid comprising a plurality of reactive particles having a surface area of greater than about 900 $m^2/gm$ and a size in the range of from about 0.10 mm to about 4 mm and including particles of an inorganic material and active metal sites, the particles of inorganic material including activated carbon and the active metal sites including sodium chemically bonded to the carbon, wherein the sodium is substantially deoxygenated to react with and remove impurities from a fluid and wherein the sodium is chemically bonded to substantially all internal and external surfaces of porous carbon particles.

4. The reactive medium of claim 2 wherein the reactive medium has a capacity for the removal of at least 5 liters of oxygen per liter of reactive medium.

5. The reactive medium of claim 2 wherein the reactive medium has a capacity for the removal of at least 8 liters of oxygen per liter of reactive medium.

6. The reactive medium of claim 2 wherein the reactive medium has a capacity for the removal of at least 12 liters of oxygen per liter of reactive medium.

7. The reactive medium of claim 2 wherein the inorganic material includes spherical carbon.

8. The reactive medium of claim 2 wherein the sodium is chemically bonded to substantially all internal and external surfaces of porous carbon particles.

* * * * *